United States Patent
Gandhi

(10) Patent No.: US 10,521,826 B2
(45) Date of Patent: Dec. 31, 2019

(54) IMAGE DISPLAY CASTING

(71) Applicant: PayPal, Inc., San Jose, CA (US)

(72) Inventor: Saumil Ashvin Gandhi, Sunnyvale, CA (US)

(73) Assignee: PAYPAL, INC., San Jose, CA (US)

( * ) Notice: Subject to any disclaimer, the term of this patent is extended or adjusted under 35 U.S.C. 154(b) by 931 days.

(21) Appl. No.: 14/553,739

(22) Filed: Nov. 25, 2014

(65) Prior Publication Data

US 2016/0148274 A1  May 26, 2016

(51) Int. Cl.
*G06Q 30/02* (2012.01)
*H04L 29/06* (2006.01)

(52) U.S. Cl.
CPC ..... *G06Q 30/0272* (2013.01); *G06Q 30/0273* (2013.01); *H04L 65/403* (2013.01)

(58) Field of Classification Search
None
See application file for complete search history.

(56) References Cited

U.S. PATENT DOCUMENTS

| | | |
|---|---|---|
| 2002/0005821 A1 | 1/2002 | Park |
| 2006/0287913 A1 | 12/2006 | Baluja |
| 2009/0083150 A1 | 3/2009 | Mashinsky |
| 2012/0154310 A1* | 6/2012 | Denny .................. G06Q 30/02 345/173 |
| 2013/0018731 A1 | 1/2013 | Morris et al. |
| 2014/0214543 A1 | 7/2014 | Gandhi et al. |
| 2016/0034964 A1* | 2/2016 | Cattone .............. G06Q 30/0267 705/14.53 |
| 2016/0100224 A1* | 4/2016 | Nordstrom ....... H04N 21/47202 725/34 |

FOREIGN PATENT DOCUMENTS

WO  WO-2016085881 A1  6/2016

OTHER PUBLICATIONS

"20 Fun Free Tools for Interactive Classroom Collaboration", by Kelly Walsh. May 4, 2014. pp. 1-6. (Year: 2014).*
"International Application Serial No. PCT/US2015/062201, International Search Report dated Jan. 29, 2016", 3 pgs.
"International Application Serial No. PCT/US2015/062201, Written Opinion dated Jan. 29, 2016", 7 pgs.

* cited by examiner

*Primary Examiner* — William A Brandenburg
(74) *Attorney, Agent, or Firm* — Maschoff Brennan

(57) ABSTRACT

A method of controlling a collaborative display is provided. A first item of content is received from a first client device. A time-to-live is assigned to the first item of content. Then, the first item of content is placed in a queue of items of content. Then a collaborative display is controlled to display an item of content at the head of the queue for a time period no less than a time-to-live assigned to the item of content at the head of the queue.

20 Claims, 10 Drawing Sheets

IMAGE DISPLAY CASTING

TECHNICAL FIELD

This application relates generally to advertising and, more specifically, to systems and methods for image display casting.

BACKGROUND

As examples of image display systems, billboard and other sign-based advertising techniques have existed for many years. Typically a billboard or sign-based advertisement is a general advertising message intended to pertain to a large number of people viewing the advertisement. Billboards and other large signs (such as bus-stop signs) typically display the same ad for an extended period of time (e.g., a few months), due to the cost of removing an old ad and putting up a new ad. More casually, corkboards are often placed in public places (e.g., coffee shops, universities, parks) where people can post their own ads (e.g., "roommate needed" or "bicycle for sale"), but there is a lack of ability to monetize these ads.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, an electronic billboard or sign is designed or configured so as to display short-term (e.g. less than a day) advertisements. The electronic billboard or sign may be designed with wireless network connectivity (e.g., WiFi, WiMax, Cellular data networks, Bluetooth, near-field communication (NFC), etc.) in order to allow for direct connection to users in the vicinity of the electronic billboard or sign. Alternatively, connections between the electronic billboard or sign and users may take place through a server.

Users may send content to the electronic billboard or sign for display. This content may be tagged with a "minimum time to live (TTL)." The minimum time to live identifies a minimum amount of time that the content should be displayed on the electronic billboard or sign. For purposes of this document, the electronic billboard or sign may be known as a collaborative display, as it allows for content to be received and displayed in a collaborative manner from a number of different users. In an example embodiment, the minimum amount of time may be based on a price per minute of advertising and a selection from a user as to how much time he or she wishes to pay for. In other example embodiments, the pricing may dynamically change based on a number of factors (e.g., time of day, users in the vicinity of the collaborative display, type of user sending the content, etc.)

In an example embodiment, the content being displayed on the electronic billboard or sign may include listings from a network-based marketplace or publication system, such as an auction system.

Figure 1:
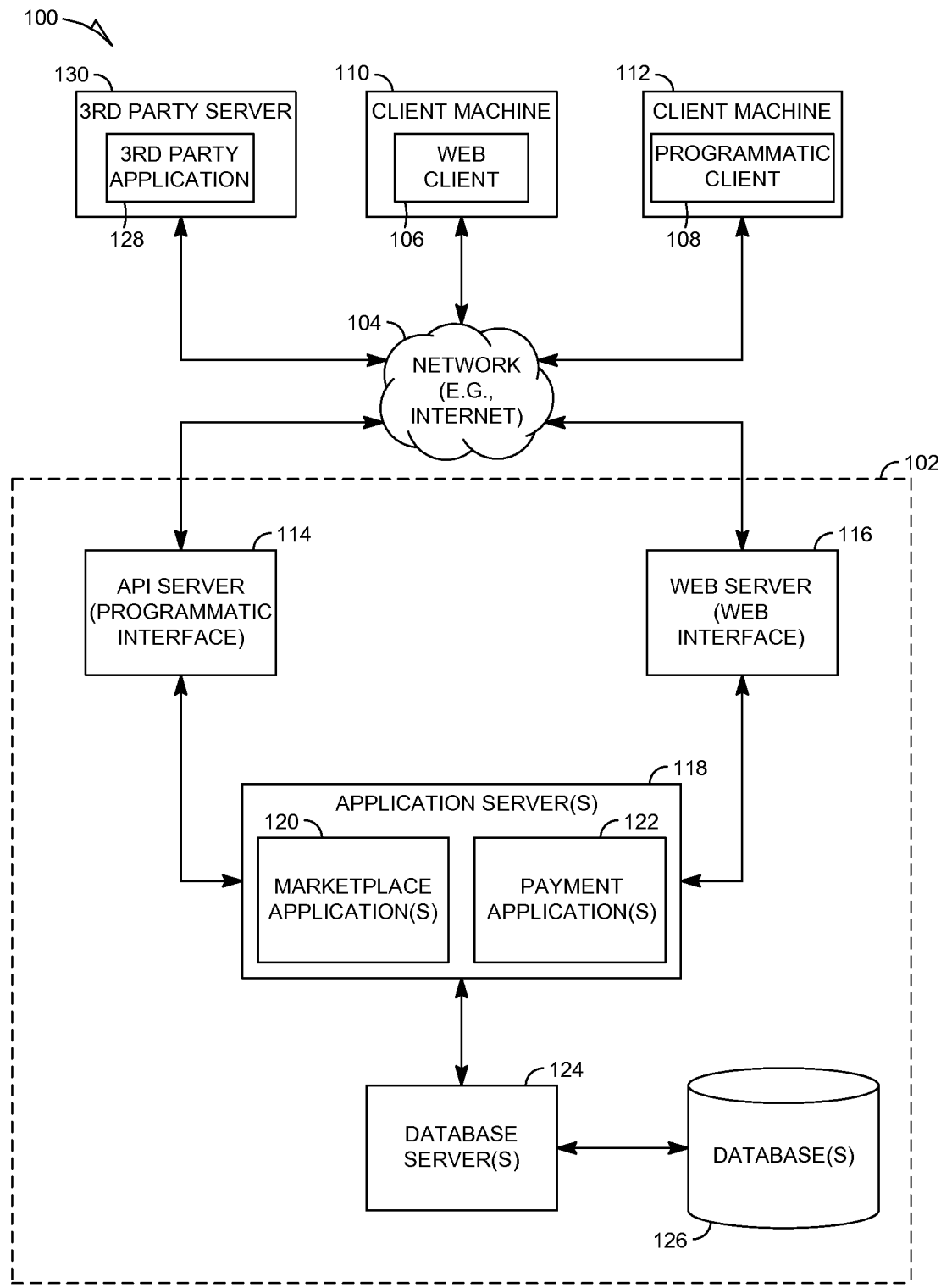
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a wide area network (WAN)) to one or more clients. FIG. 1 illustrates, for example, a web client 106 (e.g., a browser, such as the Internet Explorer browser developed by Microsoft Corporation of Redmond, Wash. State) and a programmatic client 108 executing on respective client machines 110 and 112.

An application program interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
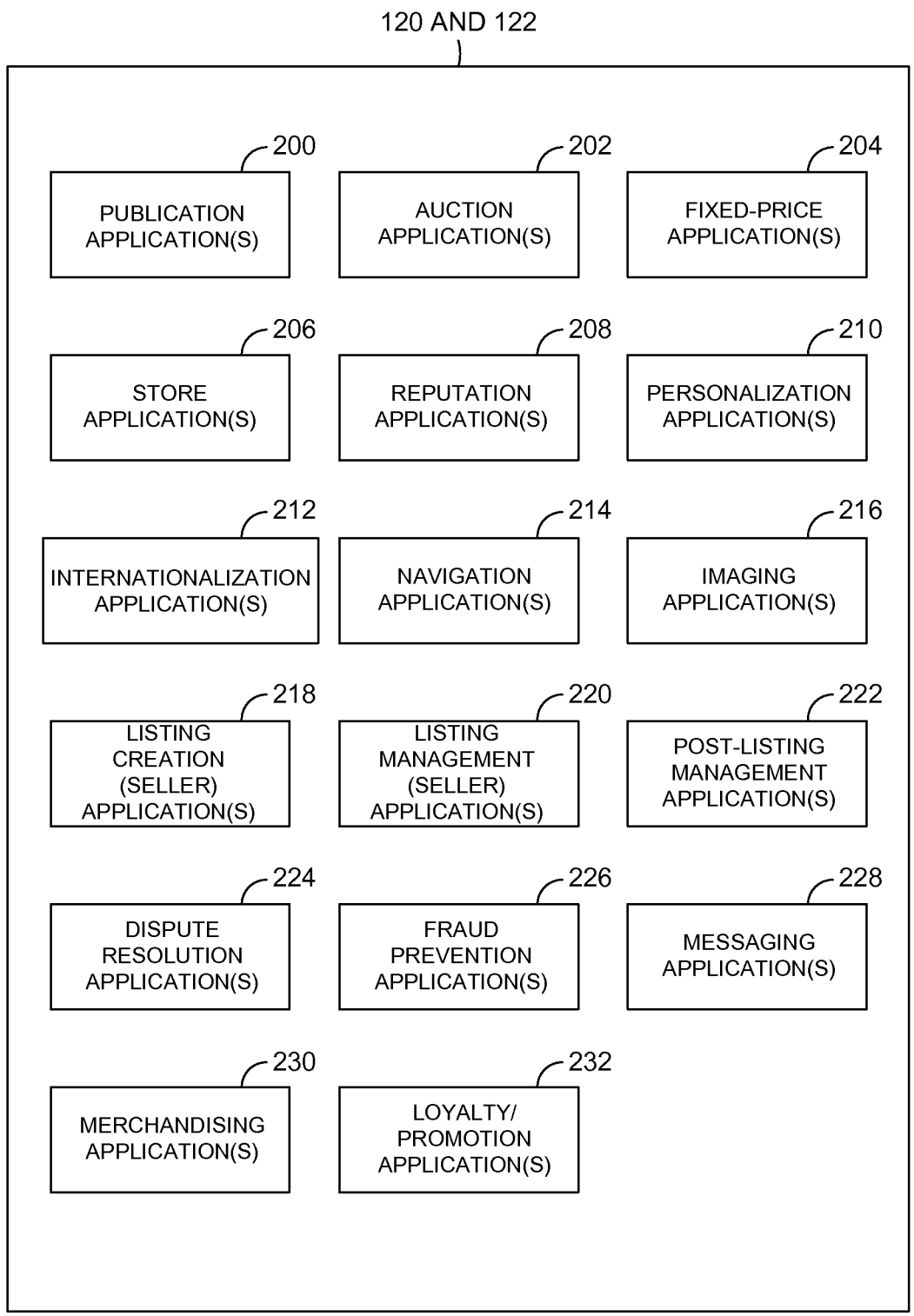
FIG. 2 is a block diagram illustrating marketplace and payment applications that, in one example embodiment, are provided as part of the networked system.

FIG. 2 is a block diagram illustrating marketplace and payment applications 120 and 122 that, in one example embodiment, are provided as part of the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions, etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make listings available via the networked system 102 as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102 (such as, for example, messages advising users regarding the status of listings at the networked system 102 (e.g., providing "outbid" notices to bidders during an auction process or to provide promotional and merchandising information to users)). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

In an example embodiment, a collaborative display may be used to display items for sale in the marketplace described above with respect to FIGS. 1 and 2. Specifically, items for sale in the database 126 and published by the publication application(s) 200, auction application(s) 202 and/or fixed-price application(s) 204 may be cast by a user device to a collaborative display. The items may then be assigned a time-to-live and displayed for no less time than the time-to-live.

In other example embodiments, the collaborative display may be used to display items of content other than items for sale in a marketplace.

Figure 3:
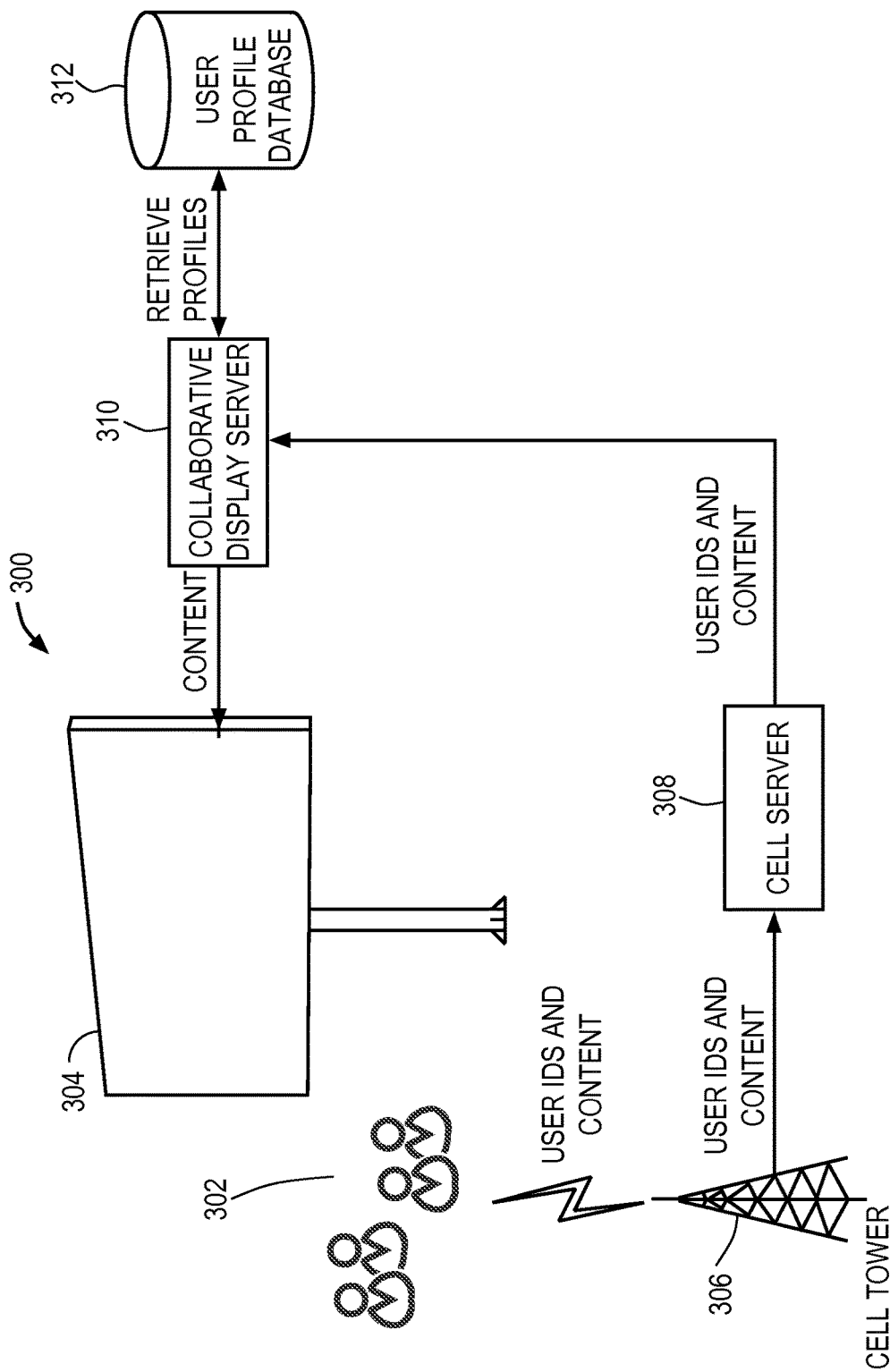
FIG. 3 is a diagram illustrating a system, in accordance with an example embodiment, of providing content on a collaborative display.

FIG. 3 is a diagram illustrating a system 300, in accordance with an example embodiment, of providing content on a collaborative display. In the system 300, users 302 may be in the vicinity of a collaborative display 304, which may be in the form of an electronic billboard or sign. The users 302 send content to be streamed on the collaborative display 304, via a cell tower 306. The content may be sent along with the user ID of the user 302 casting the content. The fact that the users 302 are in the vicinity of the collaborative display 304 may be determined in a number of different ways. In one example embodiment, mobile communication devices, such as cell phones, in the possession of the user 302 communicate with the cell tower 306. An application running on the cell phones may determine location based on, for example, global positioning system (GPS) information from GPS modules within the cell phones. This location information can be transmitted to the cell tower 306 along with the user ID and content. All of this information may be communicated via various wireless communication standards, such as Edge, 3G, 4G, LTE, WiFi, WiMax, etc. It should be noted that while the term "cell tower" and "cell server" are used, to the extent an embodiment is utilized using a non-cellular standard such as WiFi, the terms "cell tower" and "cell server" shall be interpreted broadly enough to cover the corresponding components in the non-cellular system (e.g., access point). A cell server 308 may receive this information and forward it to a collaborative display server 310. The collaborative display server 310 may then retrieve user profile information from a user profile database 312, with the user profile information corresponding to the users 302 within the collaborative display 304 and utilize information in the profile to determine a time-to-live to assign to the content. The content may then be sent to the collaborative display 304 for display.

While FIG. 3 depicts users 302 within the vicinity of the collaborative display 304, it will be recognized that users 302 that may be present outside of the vicinity of the collaborative display 304 may still update the collaborative display server 310 with their location. In some embodiments, the collaborative display server 310 may monitor locations of users 302 not yet in the vicinity of the collaborative display 304 but approaching the collaborative display 304. This allows the collaborative display server 310 to have time to retrieve the appropriate profiles from the user profile database 312 to as to be ready to receive content from a user 302 regardless of whether the user 302 is physically present near the collaborative display 304.

In another example embodiment, the collaborative display 304 can send information back to the users 302. This information, for example, could include information on when their content is going to be displayed (or has been displayed) as well as information about how other users 302 interacted with the content. For example, the collaborative display 304 may be interactive, such as using touchscreen technology, so that users 302 in front of the collaborative display 304 could touch on or otherwise manipulate content being displayed on the collaborative display 304 or by communication of information from viewer's mobile devices to the cell tower 306 (such as by sending a reply message to be shown with the content). A user 302 who had sent a piece of content being manipulated in this manner could be sent an alert describing that the content is being manipulated and how.

Additionally, in some example embodiments, users 302 may sent content to the collaborative display 304 that overlays or otherwise interacts with content sent from another user 302. For example, a first user 302 may send a picture of a newborn baby with the caption "my new daughter, isn't she an angel?" and other users 302 could send related content, such as "congratulations, she sure is!", which may be displayed simultaneously with the first user 302's picture. The first user 302 may then be notified of each of the pieces of related content sent to the collaborative display. In one example embodiment, this may be in the form of an email or text message alerting the user 302 to the related content. In another example embodiment, the related content itself may be sent to the first user 302.

Figure 4:
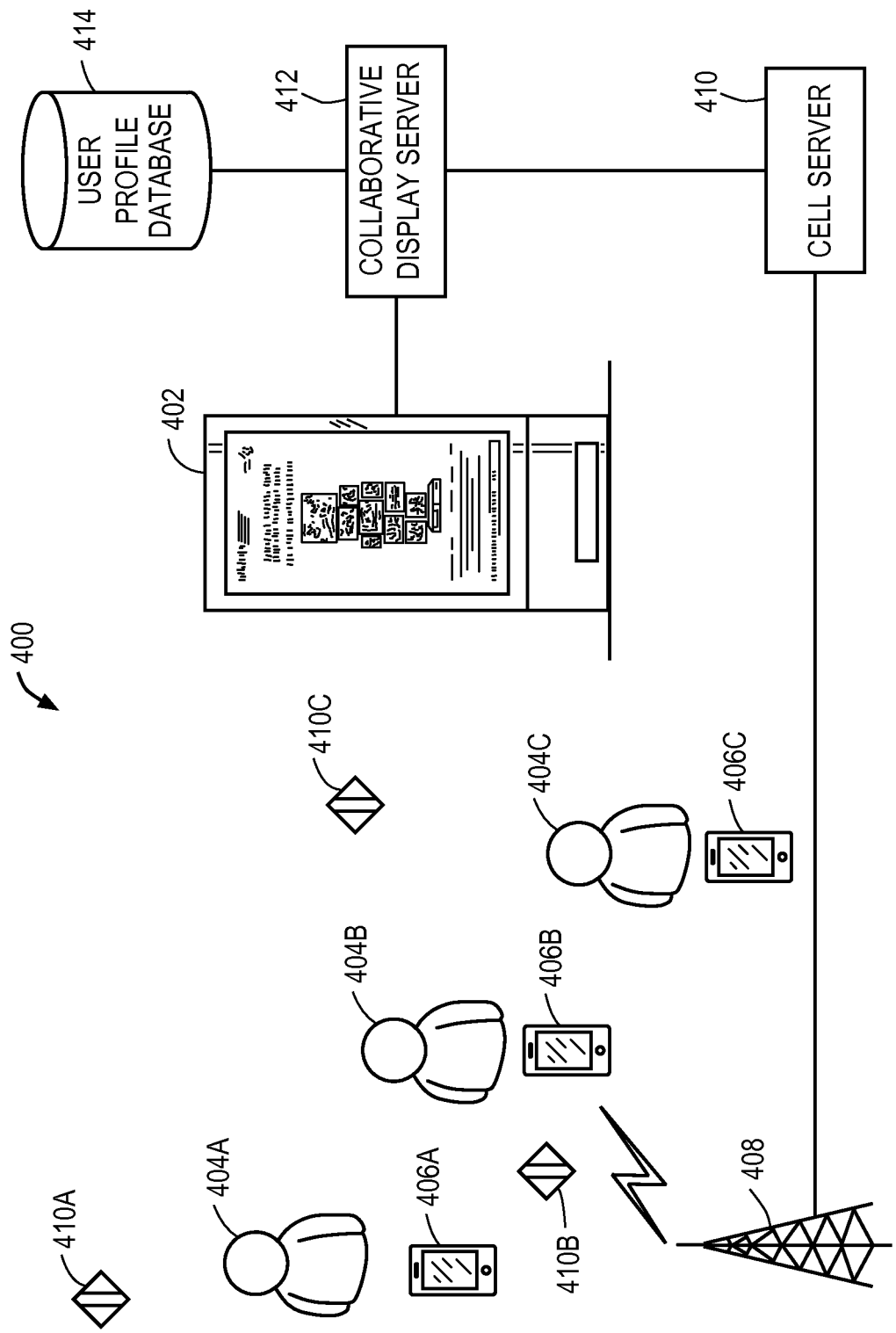
FIG. 4 is a diagram illustrating a system, in accordance with an example embodiment, including a collaborative display.

It should be noted that while the above figures depict a system utilizing GPS locations of users 302, there may be instances where GPS locations may not be operable or preferable to be used. FIG. 4 is a diagram illustrating a system 400, in accordance with an example embodiment, including a collaborative display 402. Here, the collaborative display 402 may be located in a shopping mall, where individuals 404A-404C passing by can view it. The individuals 404A-404C may have mobile devices 406A-406C, which can send content and identification information to a cell tower 408. Due to the difficulty in obtaining accurate GPS signals inside shopping malls, in cases where such signals may be blocked, an alternative system for obtaining user location may be used. For example, sensors 410A-410C may be placed in the shopping mall, detecting passing mobile devices 406A-406C. These sensors 410A-410C may utilize various wireless communications standards, such as Bluetooth or near-field communication (NFC) standards.

The cell tower 408 may send the content to a cell server 410 which forwards it to a collaborative display server 412. The collaborative display server 412 may then retrieve user profile information from a user profile database 414, with the user profile information corresponding to the individuals 404A-404C within the collaborative display 402 and utilize information in the profile to determine a time-to-live to assign to the content. The content may then be sent to the collaborative display 402 for display.

Figure 5:
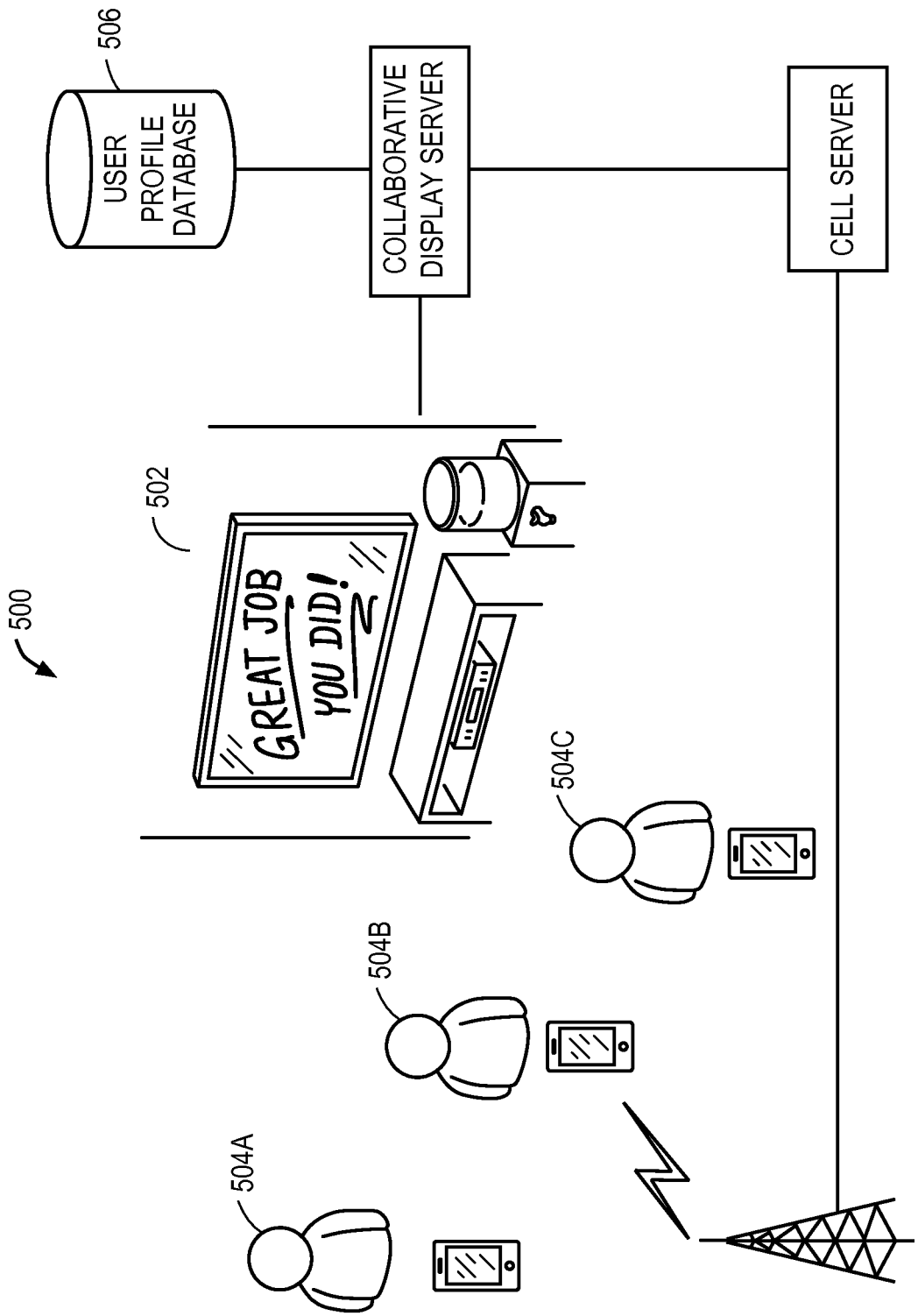
FIG. 5 is a block diagram illustrating a system including a collaborative display 502 in an office environment.

In an example embodiment, the collaborative display 402 may be placed in a private or semi-private setting, such as in an office. FIG. 5 is a block diagram illustrating a system 500 including a collaborative display 502 in an office environment. Various employees 504A-504C may send items of content to display on the collaborative display 502 in the same manner as described above with respect to FIGS. 3 and 4. Since this is a private or semi-private setting, there may be no charge for the displaying of the content, and employees 504A-504C may be encouraged to send items of content to be displayed. An employee 504 may wish to display, for example, a chart showing the recent quarterly sales, or an inspirational message, or photographs of the employee 504's newborn baby. As with the embodiment presented above with respect to FIG. 3, a user profile database 506 may be accessed to obtain information about the user 302. This may allow an embodiment where only certain employees 504 are allowed to have their content displayed on the collaborative display 502. Additionally, in an example embodiment, the type of content the user 302 sends to the collaborative display 502 is scanned and compared to a mapping of content types and users 302. In other words, certain users 302 may be permitted to have certain types of content displayed on the collaborative display 502 but not other types of content. For example, perhaps executives of the company are allowed to have photos, reports, and text messages displayed on the collaborative display 502 but rank-and-file employees 504 are only able to have reports displayed on the collaborative display 502.

In an example embodiment, a single time-to-live (TTL) is assigned to all content to be displayed on the collaborative display 502. Thus, for example, each employee 504's piece of content may be displayed for 10 minutes. In another example embodiment, the TTL of individual pieces of content can vary based on a number of factors. For example, certain users 302 (e.g., executives) may have their content tagged with longer TTL than other users 302. Alternatively, performance metrics may be analyzed to determine TTL. For example, employees 504 who have hit certain sales goals may have their content tagged with longer TTL than employees 504 who have not hit sales goals.

In another example embodiment, one or more of the employees 504A-504C can create a list of content items they wish to send. This list may be stored on their respective mobile devices 406 and some or all of the content items in the list may be transmitted to the collaborative display 502 when the employee 504A-504C is in the vicinity of the collaborative display 502. This way the employee 504A-504C does not need to waste time in front of the collaborative display 502 selecting the content to send. Of course, this feature can be extended to the public collaborative displays 304 and 402 of FIGS. 3 and 4 as well.

In another example embodiment, the collaborative display 502 may have one or more applications built into it, enabling the employees 504A-504C to send only the data related to the content. For example, the collaborative display 502 may have a spreadsheet application built into it, allowing an employee 504 to send a spreadsheet itself to the collaborative display 502 to be displayed or charted. This allows for much less data to be transmitted over whatever network is being used for the content, saving network bandwidth.

Figure 6:
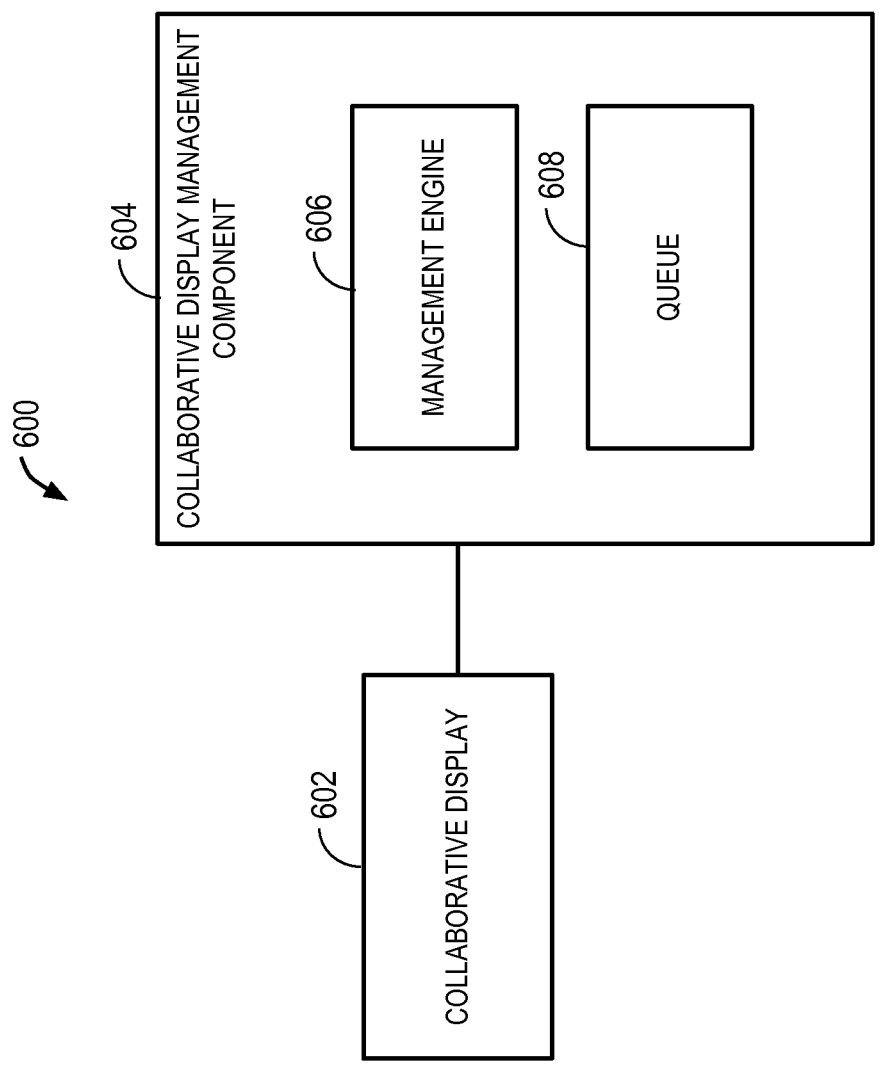
FIG. 6 is a block diagram illustrating a collaborative display system in accordance with an example embodiment.

In the above example embodiments, the content is described as being "sent" from one or more users 302 to the collaborative display 502. In an example embodiment, the collaborative display 502 may be tied to a collaborative display management component, either integrated within the collaborative display 502 or communicatively coupled thereto. FIG. 6 is a block diagram illustrating a collaborative display system in accordance with an example embodiment. The collaborative display system 600 may include the collaborative display 602 and the collaborative display management component 604. The collaborative display management component 604 may include a management engine 606 and a queue 608. The queue 608 may store one or more pieces of content waiting to be displayed along with information about their respective displays (e.g., TTL for each piece of content). The management engine 606 may manage the content in the queue 308 according to an ordering scheme. In an example embodiment, the ordering scheme may be a first-in-first-out (FIFO) management scheme, but in other embodiments more complex ordering schemes may be utilized, such as ones that place high priority content at the front of the line, or ones that take into account the relative TTLs to stagger content for maximum viewing effect. In an example embodiment, the time of day may also affect the ordering scheme. For example, rather than place high priority content at the front of the line, the line can be managed so that high priority content is displayed during optimal viewing times (e.g., times when the most people will pass by the collaborative display 602, or times when people are going to be likelier to pay attention to content on the collaborative display 602 (e.g., during break times)).

While the above embodiments describe the content as being "sent" from one or more users 302 to the collaborative display 602, in an example embodiment, the content may actually be streamed in real-time from the one or more users 302 to the collaborative display 602. This can be used with any type of content, for example a photo could be streamed as a user 302 walks by the collaborative display 602, but this embodiment may be most valuable in situations where the content is being captured live by the user 302. For example, as will be described in more detail below, there may be circumstances where a live video feed recorded by a camera on a user 302's mobile device 406 could be streamed and displayed on the collaborative display 602 in real time.

Figure 7:
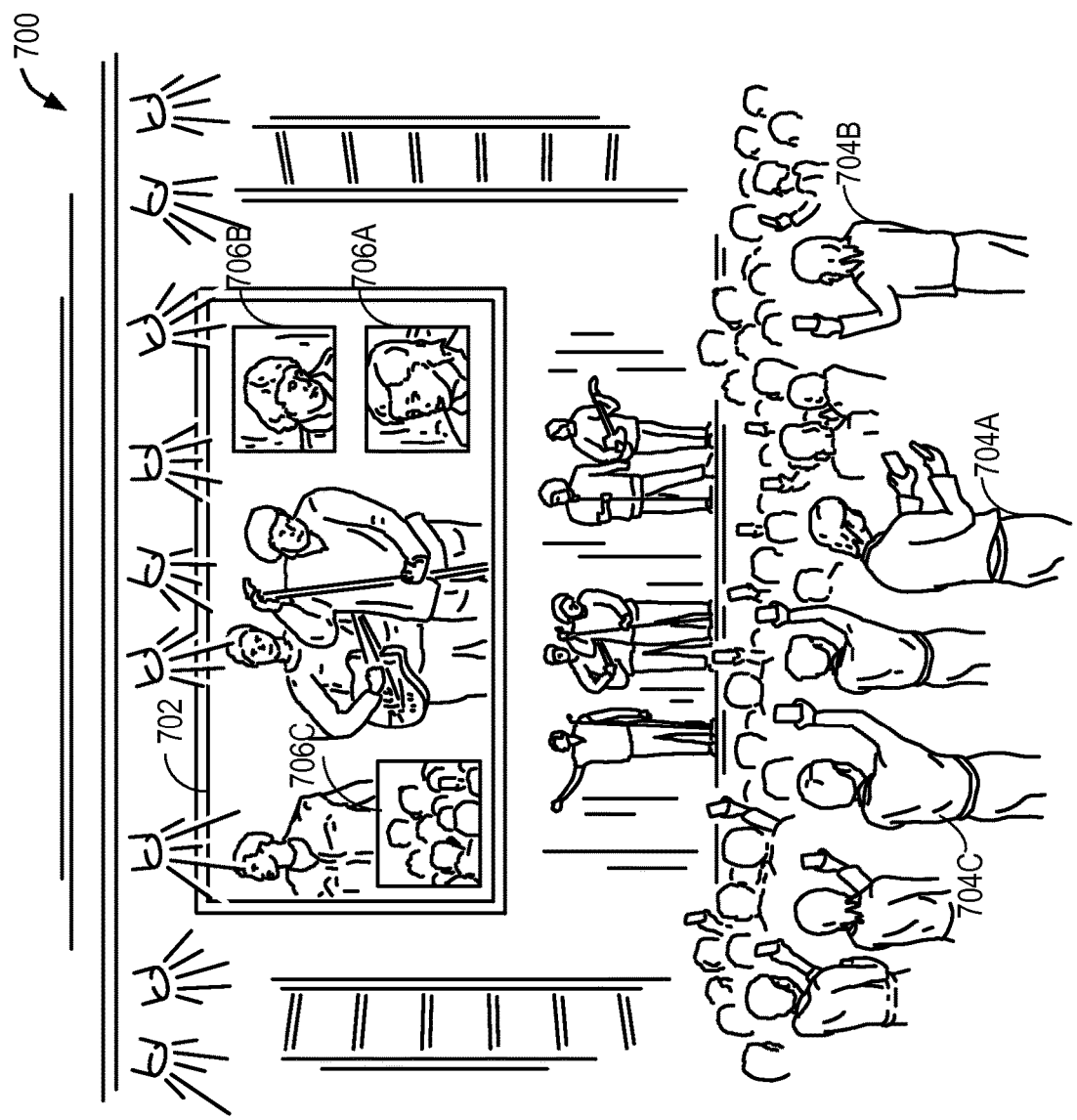
FIG. 7 is a diagram illustrating a system including a collaborative display 702 in a stadium environment, in accordance with an example embodiment.

FIG. 7 is a diagram illustrating a system 700 including a collaborative display 702 in a stadium environment in accordance with an example embodiment. The collaborative display 702 is located in a prominent place in a stadium or other performance venue. While there may be many users in the stadium, certain users, specifically users 704A-704C may have special tickets (perhaps purchased for extra money) that contain a bar code or some other scannable material (e.g., QR code). Each of the users 704A-704C can use a mobile device 406 to scan the bar code, which allows for live feeds from cameras on the mobile devices 406 to be streamed to the collaborative display 702. At various points throughout a concert or sporting event, one or more of the live feeds or videos 706A-706C from the users 704A-704C can be displayed on the collaborative display 702.

Figure 8:
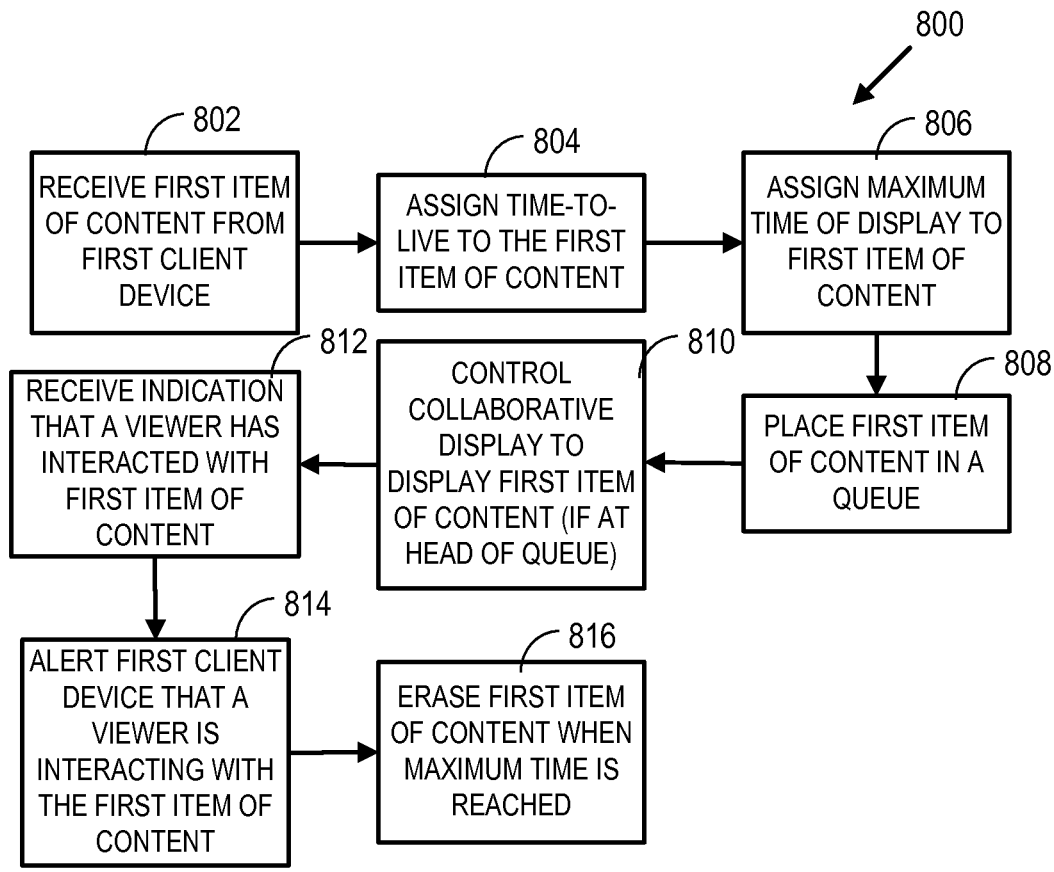
FIG. 8 is a flow diagram illustrating a method, in accordance with an example embodiment, of controlling a collaborative display.

FIG. 8 is a flow diagram illustrating a method 800, in accordance with an example embodiment, of controlling a collaborative display 702. In an example embodiment, this method may be performed by a collaborative display management component 604. At operation 802, a first item of content is received from a first client device. At operation 804, a time-to-live is assigned to the first item of content. In an example embodiment, the time-to-live is based, at least partially, on an amount of time purchased by a user 704 of the first client device. At operation 806, a maximum time of display is assigned to the first item of content. At operation 808, the first item of content is placed in a queue 608 of items of content. In one example embodiment, this includes placing the first item of content at the back of the queue 608 in accordance with a first-in-first-out algorithm. In another example embodiment, various factors may be used to place the item of content in a strategic place in the queue, such as looking at the importance of the user 704 who sent the first item of content, a price paid for showing the first item of content on the collaborative display 702 (e.g., a premium price paid to be near the head of the queue), and so on. At operation 810, a collaborative display 702 is controlled to display the item of content at the head of the queue 608 for a time period no less than a time-to-live assigned to the item of content at the head of the queue 608 and no more than the maximum amount of time assigned to the item of content at the head of the queue. For purposes of this figure, it may be assigned that the first item of content is at the head of the queue. At operation 812, an indication that a viewer of the collaborative display 702 has interacted with the first item of content being displayed on the collaborative display 702 may be received. At operation 814, the first client device is alerted that a viewer is interacting with the first item of content on the collaborative display 702. In an example embodiment, this may include alerting the first client device as to details of how the viewer is interacting with the first item of content (e.g., what the viewer is typing or the portion of the item of content the viewer is touching on the collaborative display 702). At operation 816, once the maximum amount of time assigned to the item of content at the head of the queue 608 has passed, the item of content at the head of the queue 608 may be erased from the collaborative display 702 (and the queue 608 and/or collaborative display server 412).

Example Mobile Device

Figure 9:
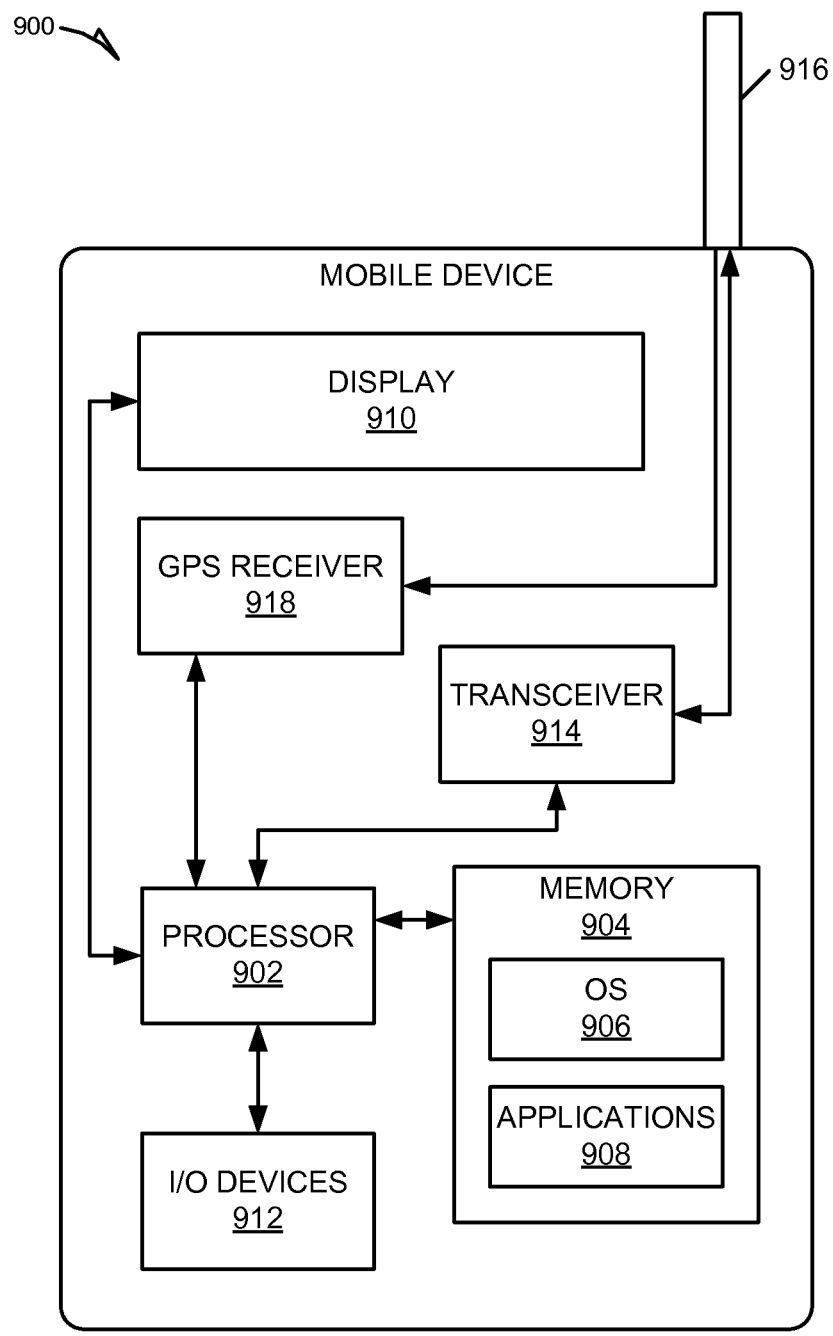
FIG. 9 is a block diagram illustrating a mobile device, according to an example embodiment.

FIG. 9 is a block diagram illustrating a mobile device 900, according to an example embodiment. The mobile device 900 may include a processor 902. The processor 902 may be any of a variety of different types of commercially available processors suitable for mobile devices (for example, an XScale architecture microprocessor, a microprocessor without interlocked pipeline stages (MIPS) architecture processor, or another type of processor 902). A memory 904, such as a random access memory (RAM), a flash memory, or other type of memory, is typically accessible to the processor 902. The memory 904 may be adapted to store an operating system (OS) 906, as well as applications 908, such as a mobile location-enabled application that may provide location-based services (LBSs) to a user 704. The processor 902 may be coupled, either directly or via appropriate intermediary hardware, to a display 910 and to one or more input/output (I/O) devices 912, such as a keypad, a touch panel sensor, a microphone, and the like. Similarly, in some embodiments, the processor 902 may be coupled to a transceiver 914 that interfaces with an antenna 916. The transceiver 914 may be configured to both transmit and receive cellular network signals, wireless data signals, or other types of signals via the antenna 916, depending on the nature of the mobile device 900. Further, in some configurations, a GPS receiver 918 may also make use of the antenna 916 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors 902 may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field-programmable gate array (FPGA) or an application-specific integrated circuit (ASIC)) to perform certain operations. A hardware-implemented module may also comprise programmable logic or circuitry (e.g., as encompassed within a general-purpose processor 902 or other programmable processor 902) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 902 configured using software, the general-purpose processor 902 may be configured as respective different hardware-implemented modules at different times. Software may accordingly configure the processor 902, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 902 or processor-implemented modules. The performance of certain of the operations may be distributed among the one or more processors 902, not only residing within a single machine, but deployed across a number of machines. In some example embodiments, the processor 902 or processors 902 may be located in a single location (e.g., within a home environment, an office environment, or a server farm), while in other embodiments the processors 902 may be distributed across a number of locations.

The one or more processors 902 may also operate to support performance of the relevant operations in a "cloud computing" environment or as a "software as a service" (SaaS). For example, at least some of the operations may be performed by a group of computers (as examples of machines including processors 902), these operations being accessible via a network 104 (e.g., the Internet) and via one or more appropriate interfaces (e.g., application program interfaces (APIs)).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 902, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network 104.

In example embodiments, operations may be performed by one or more programmable processors 902 executing a computer program to perform functions by operating on input data and generating output. Method operations can also be performed by, and apparatus of example embodiments may be implemented as, special-purpose logic circuitry, e.g., a field-programmable gate array (FPGA) or an application-specific integrated circuit (ASIC). The computing system can include clients and servers. A client and server are generally remote from each other and typically interact through a communication network 104. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 902), or in a combination of permanently and temporarily configured hardware may be a design choice. Below are set out hardware (e.g., machine) and software architectures that may be deployed, in various example embodiments.

Example Machine Architecture and Machine-Readable Medium

Figure 10:
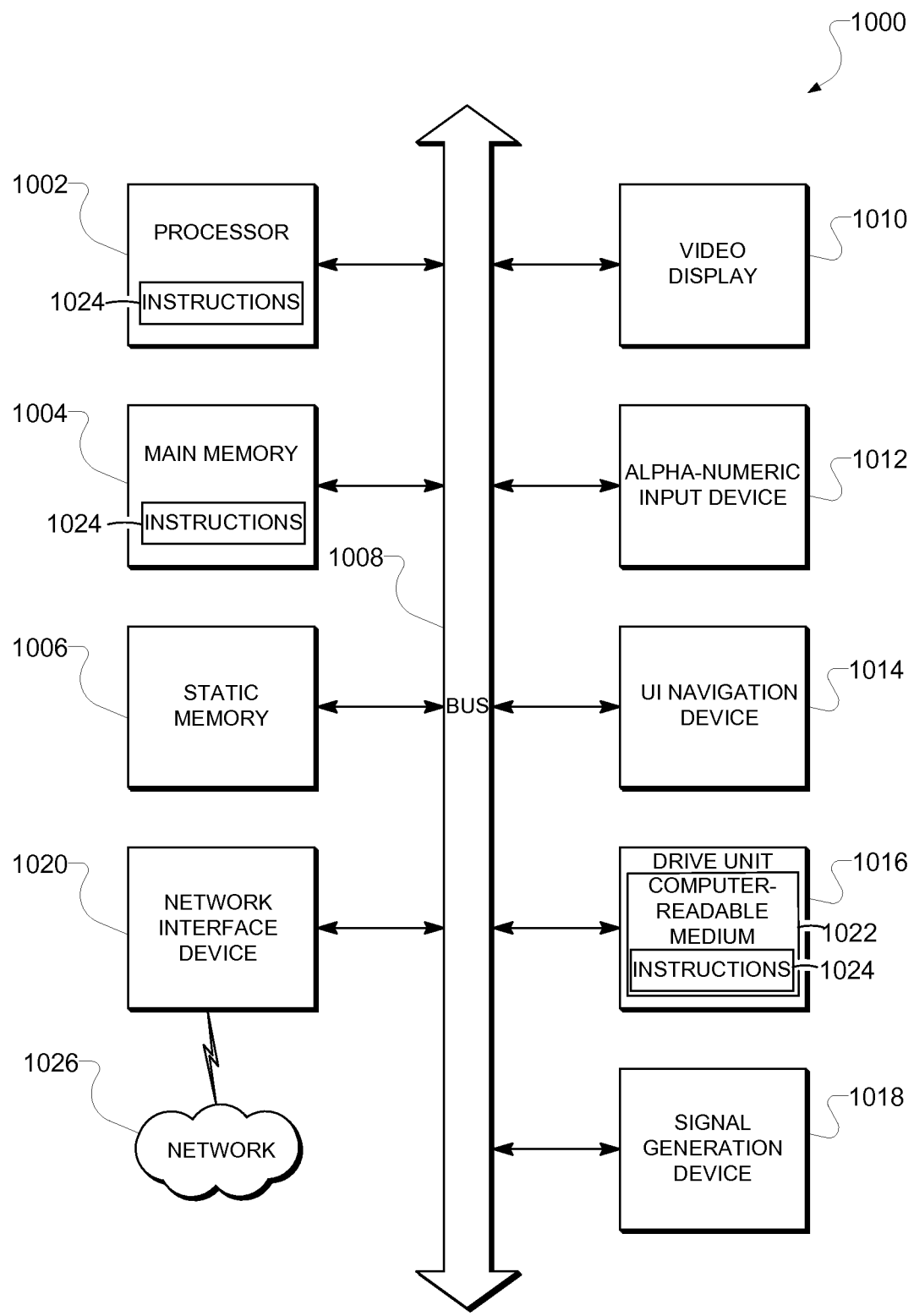
FIG. 10 is a block diagram of a machine in the example form of a computer system within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute a set (or multiple sets) of instructions 1024 to perform any one or more of the methodologies discussed herein.

The example computer system 1000 includes a processor 1002 (e.g., a central processing unit (CPU), a graphics processing unit (GPU), or both), a main memory 1004 and a static memory 1006, which communicate with each other via a bus 1008. The computer system 1000 may further include a video display 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation (e.g., cursor control) device 1014 (e.g., a mouse), a drive unit 1016, a signal generation device 1018 (e.g., a speaker) and a network interface device 1020.

Machine-Readable Medium

The drive unit 1016 includes a computer-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting computer-readable media 1022.

While the computer-readable medium 1022 is shown in an example embodiment to be a single medium, the term "computer-readable medium" may include a single medium or multiple media (e.g., a centralized or distributed database 126, and/or associated caches and servers) that store the one or more instructions 1024 or data structures. The term "computer-readable medium" shall also be taken to include any tangible medium that is capable of storing, encoding or carrying instructions 1024 for execution by the machine and that cause the machine to perform any one or more of the methodologies of the present disclosure, or that is capable of storing, encoding or carrying data structures utilized by or associated with such instructions 1024. The term "computer-readable medium" shall accordingly be taken to include, but not be limited to, solid-state memories, and optical and magnetic media. Specific examples of computer-readable media 1022 include non-volatile memory, including, by way of example, semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a network 1026 using a transmission medium. The instructions 1024 may be transmitted using the network interface device 1020 and any one of a number of well-known transfer protocols (e.g., HTTP). Examples of communication networks 1026 include a local area network ("LAN"), a wide area network ("WAN"), the Internet, mobile telephone networks, plain old telephone (POTS) networks, and wireless data networks (e.g., WiFi and WiMAX networks). The term "transmission medium" shall be taken to include any intangible medium that is capable of storing, encoding or carrying instructions 1024 for execution by the machine, and includes digital or analog communications signals or other intangible media to facilitate communication of such software.

Although the inventive subject matter has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single embodiment if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:
1. A system, comprising:
  a collaborative display comprising:
    an electronic screen;
    a graphics controller comprising one or more processors coupled to the electronic screen and configured to display graphics on the electronic screen;
    a collaborative display management component comprising one or more processors and configured to:
    receive items of content via one or more networks from one or more client devices, each of the items of content having been selected to be presented by the collaborative display;
    for each of the items of content:
      assign a display duration to the item of content;
      determine a queue placement characteristic for the item of content; and
      place the item of content in a queue based on the queue placement characteristic, wherein the queue is configured to store the items of content waiting to be displayed along with information pertaining to the display of the respective items of content that includes the display duration;
    send to the graphics controller a first item of content at a head of the queue and first information pertaining to the display of the first item of content, the first item of content being received from a first client device;

remove the first item of content from the queue, causing a second item of content to move to the head of the queue;

allow the first item of content to be displayed on the electronic screen for a period of time greater than or equal to the display duration assigned to the first item of content as indicated in the first information;

receive, from a second client device that is geographically near the first client device, a third item of content that is related to the first item of content;

cause, in response to the third item of content being related to the first item of content, the third item of content to be presented simultaneously with the first item of content on the electronic screen for at least a portion of the display duration associated with the first item of content; and in response to a determination that the first item of content has been displayed on the electronic screen for the period of time greater than or equal to the display duration assigned to the first item of content, send to the graphics controller the second item of content such that the second item of content is displayed on the electronic screen.

2. The system of claim 1, wherein the electronic screen is a touchscreen display.

3. The system of claim 2, wherein input received on the touchscreen display during the displaying of the first item of content is sent from the collaborative display to the collaborative display management component, wherein the collaborative display management component informs the client device associated with the first item of content of the input responsive to receiving the input.

4. The system of claim 1, wherein the collaborative display management component is located on the collaborative display.

5. The system of claim 1, wherein the collaborative display management component is located on a collaborative display server separate and distinct from the collaborative display.

6. The system of claim 5, wherein the collaborative display server is located on a cell server.

7. The system of claim 5, wherein the collaborative display server is configured to control a plurality of collaborative displays.

8. A method, comprising:

receiving a first item of content from a first client device, the first item of content having been selected to be presented by a collaborative display;

assigning a display duration to the first item of content;

determining a queue placement characteristic for the first item of content;

placing the first item of content in a queue of items of content based on the queue placement characteristic, wherein the queue is configured to store the items of content waiting to be displayed along with information pertaining to the display of the respective items of content;

receiving, from a second client device, a second item of content that is related to the first item of content;

determining, in response to the second item of content being related to the first item of content, that the second item of content is to be presented simultaneously with the first item of content on a collaborative display for at least a portion of the display duration associated to the first item of content; and controlling the collaborative display to:

display the first item of content responsive to the first item of content being at a head of the queue for a time period no less than the display duration assigned to the first item of content, and display the second item of content simultaneously on the collaborative display with the first item of content for at least a portion of the display duration associated with the first item of content.

9. The method of claim 8, wherein the display duration assigned to the first item of content is based on an amount of time purchased by a user of the first client device.

10. The method of claim 8, further comprising assigning a maximum time of display for the first item of content and, responsive to a detection that the first item of content has been displayed on the collaborative display for an amount of time exceeding the maximum time of display, causing the collaborative display to not display the first item of content and to erase the first item of content from the collaborative display and collaborative display management component.

11. The method of claim 8, further comprising:

receiving an indication that a viewer of the collaborative display has interacted with the first item of content being displayed on the collaborative display; and alerting the first client device that the viewer is interacting with the first item of content.

12. The method of claim 11, wherein the alerting includes alerting the first client device as to details of how the viewer is interacting with the first item of content.

13. The method of claim 8, further comprising receiving a location of the first client device, wherein the queue placement characteristic is determined based on the location of the first client device.

14. The method of claim 8, further comprising:

retrieving a user profile associated with the first client device, wherein the queue placement characteristic is determined based on information in the user profile.

15. The method of claim 8, further comprising:

retrieving a user profile associated with the first client device, wherein the first item of content is assigned a display duration based on information in the user profile.

16. A non-transitory computer-readable storage medium comprising instructions that, when executed by at least one processor of a machine, cause the machine to perform operations comprising:

receiving a first item of content from a first client device, the first item of content having been selected to be presented by a collaborative display;

assigning a display duration to the first item of content;

determining a queue placement characteristic for the first item of content;

placing the first item of content in a queue of items of content based on the queue placement characteristic, wherein the queue is configured to store the items of content waiting to be displayed along with information pertaining to the display of the respective items of content that includes the display duration;

receiving, from a second client device, a second item of content that is related to the first item of content;

determining, in response to the second item of content being related to the first item of content, that the second item of content is to be presented simultaneously with the first item of content on a collaborative display for at least a portion of the display duration associated to the first item of content; and controlling the collaborative display to:
  display the first item of content responsive to the first item of content being at a head of the queue for a time period no less than the display duration assigned to the first item of content, and
  display the second item of content simultaneously on the collaborative display with the first item of content for at least a portion of the display duration associated with the first item of content.

17. The non-transitory computer-readable storage medium of claim 16, wherein the display duration assigned to the first item of content is based on an amount of time purchased by a user of the first client device.

18. The non-transitory computer-readable storage medium of claim 16, wherein the operations further comprise assigning a maximum time of display for the first item of content and, responsive to a detection that the first item of content has been displayed on the collaborative display for an amount of time exceeding the maximum time of display, causing the collaborative display to not display the first item of content and to erase the first item of content from the collaborative display and collaborative display server.

19. The non-transitory computer-readable storage medium of claim 16, wherein the operations further comprise:
  receiving an indication that a viewer of the collaborative display has interacted with the first item of content being displayed on the collaborative display; and
  alerting the first client device that the viewer is interacting with the first item of content.

20. The non-transitory computer-readable storage medium of claim 19, wherein the alerting includes alerting the first client device as to details of how the viewer is interacting with the first item of content.

\* \* \* \* \*